(12) United States Patent
Cahn

(10) Patent No.: US 7,543,057 B1
(45) Date of Patent: *Jun. 2, 2009

(54) METHOD FOR MONITORING A NETWORK

(75) Inventor: Robert Cahn, Carmel, NY (US)

(73) Assignee: AT&T Intellectual Property II, L.P., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 11/649,531

(22) Filed: Jan. 4, 2007

Related U.S. Application Data (63) Continuation of application No. 09/643,473, filed on Aug. 22, 2000, now Pat. No. 7,177,927.

(51) Int. Cl.
G06F 15/173 (2006.01)
H04L 12/28 (2006.01)

(52) U.S. Cl. ............... 709/224; 709/238; 709/239; 709/241; 370/351

(58) Field of Classification Search ............ 709/224, 709/238, 239, 241; 370/351
See application file for complete search history.

(56) References Cited

U.S. PATENT DOCUMENTS

| | | | | |
|---|---|---|---|---|
| 5,115,495 A | * | 5/1992 | Tsuchiya et al. | 709/239 |
| 5,699,347 A | * | 12/1997 | Callon | 370/238 |
| 6,256,295 B1 | * | 7/2001 | Callon | 370/254 |
| 6,282,170 B1 | * | 8/2001 | Bentall et al. | 370/225 |
| 6,304,549 B1 | * | 10/2001 | Srinivasan et al. | 370/230 |
| 6,321,271 B1 | * | 11/2001 | Kodialam et al. | 709/241 |
| 6,529,498 B1 | * | 3/2003 | Cheng | 370/351 |
| 6,658,479 B1 | * | 12/2003 | Zaumen et al. | 709/238 |

* cited by examiner

Primary Examiner—Kenny S Lin (57) ABSTRACT

The method disclosed monitors the status of a network by a network management system that includes information describing the current network topology information describing possible restoration routes. From this information, the network management system computes three measures of network health: (1) the sum of unrouted permanent virtual circuits, (2) the sum of permanent virtual circuits whose cost exceeds a prescribed multiple of an optimal route cost and (3) the sum of permanent virtual circuits off an optimal path. Each of these measures relates to a different aspect of network health, and collectively they provide a measure of overall network performance. The method compares the measures of network health to a threshold value and selects an optimum restoration route from the stored restoration routes.

3 Claims, 7 Drawing Sheets

METHOD FOR MONITORING A NETWORK

This application is a continuation of prior application Ser. No. 09/643,473 filed Aug. 22, 2000 now U.S. Pat. No. 7,177,927 which is incorporated herein by reference.

BACKGROUND OF THE INVENTION

Field of the Invention

The invention disclosed broadly relates to communications networks and more particularly relates to network monitoring techniques to optimize network performance.

Consider the case when an Atlantic cable becomes unavailable and the traffic from New York City to London must be rerouted via New York City-San Francisco-Hawaii-Tokyo-Singapore-Tel Aviv-Paris-London. After the network outage has been restored, it is not true that the traffic immediately moves back to the preferred route. This is due to several factors:

[1] There is a concern that by moving all the traffic back immediately the nodes may fail in a "fire storm" of activity. The network can be capsized like a ship when all the passengers rush from one side to the other.

[2] Other traffic may have preempted some essential bandwidth before the restoral is attempted and there is not enough capacity to reroute the traffic.

[3] The network may be dealing with other outages and be too busy to attempt the restoral.

Whatever the reasons, it is essential that the network operator be able to monitor the "network health" of the system. The invention disclosed herein does just that.

SUMMARY OF THE INVENTION

Briefly, in accordance with the invention, there is provided a method to monitor the status of a network by a network management system that includes information describing the current network topology including information describing possible restoration routes. From this information, the network management system computes three measures of network health: (1) the sum of unrouted permanent virtual circuits, (2) the sum of permanent virtual circuits whose cost exceeds a prescribed multiple of an optimal route cost and (3) the sum of permanent virtual circuits off an optimal path. Each of these measures relates to a different aspect of network health, and collectively they provide a measure of overall network performance. The method compares the measures of network health to a threshold value and selects an optimum restoration route from the stored restoration routes.

DISCUSSION OF THE PREFERRED EMBODIMENT

Figure 1:
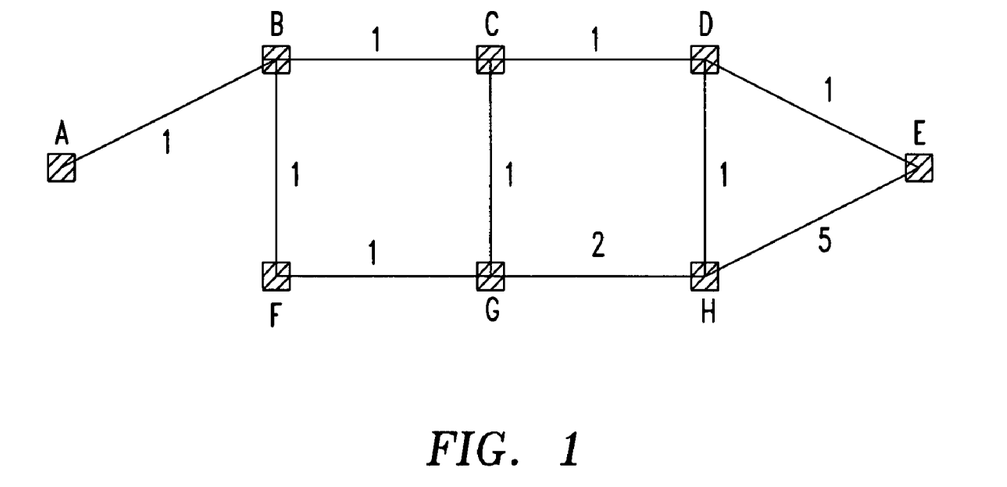
FIGS. 1 to 7 show a network of eight nodes and I/O links with various examples of traffic patterns and outages.

FIG. 1 shows a network of eight nodes and I/O links with an example traffic pattern to indicate how the network health method operates. Each of the nodes can be a network router which includes a data processor. The network health method can be implemented as a computer program which can be executed on each data processor within each router, in a distributed manner. Alternately, each router can be linked to a central data processor (not shown) which runs the program to control the routers. The nodes are named A through H and the links have the weights or administrative costs shown. To keep things simple assume that the following traffic:

Between A and E there are 2 units of flow.

Between B and E there are 3 units of flow.

Between B and H there are 2 units of flow.

Between F and E there are 3 units of flow.

Between H and F there are 5 units of flow.

Figure 2:
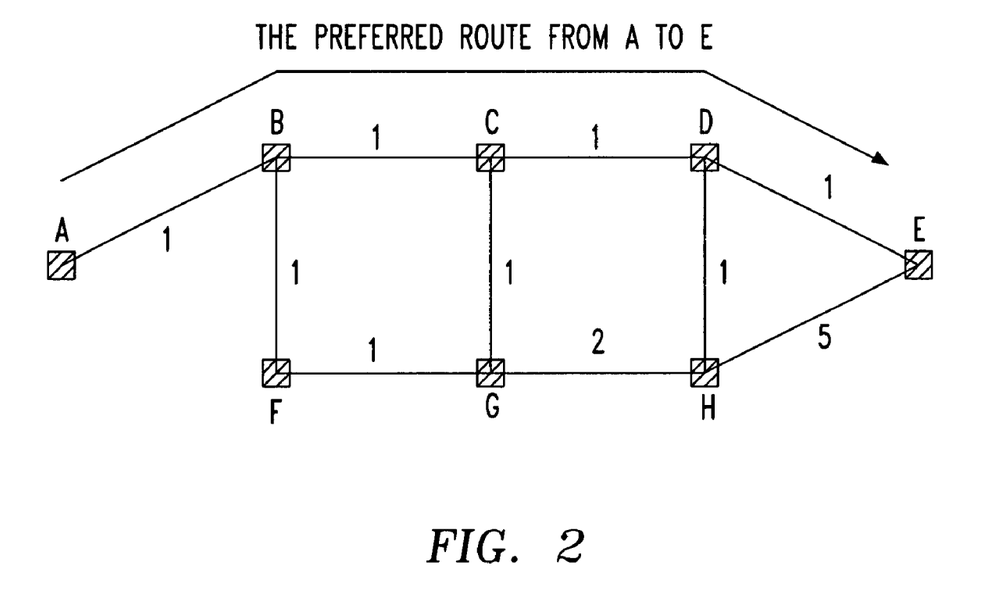

If the capacity of each link is 20, then all the traffic can follow the "best" or shortest path. FIG. 2 illustrates some of the obvious and unobvious routes. The preferred route is from A to E in FIG. 2.

Figure 3:
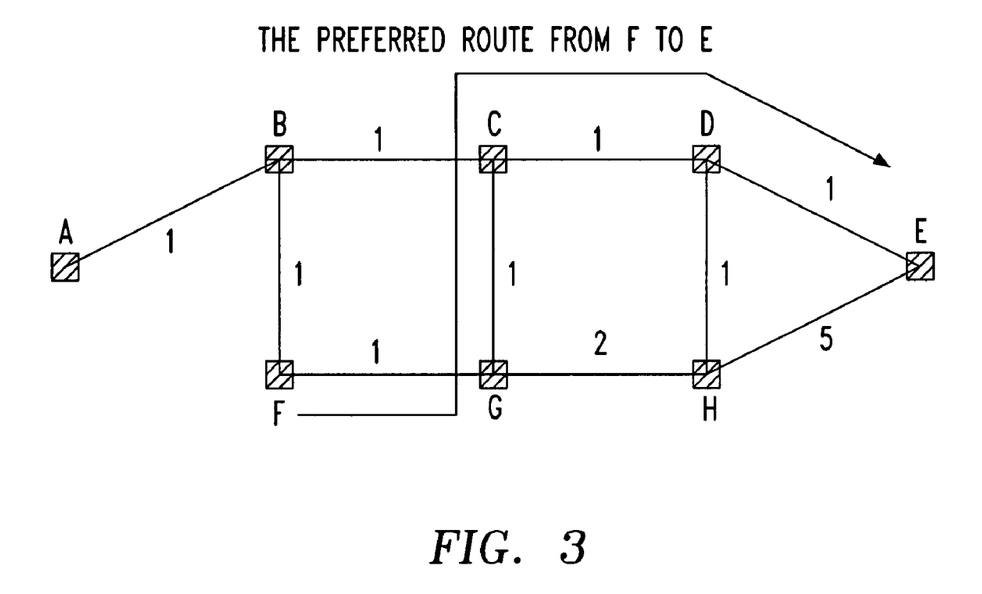

In FIG. 3, the best route from F to E is also of weight 4 but takes 4 hops rather than the 3-hop path, F-G-H-E with weight 8.

Listed below are all the "shortest routes" for the traffic as follows:

Between A and E the shortest route is A-B-C-D-E with an administrative cost of 4.

Between B and E the shortest route is B-C-D-E with an administrative cost of 3.

Between B and H the shortest route is B-C-D-H with an administrative cost of 3.

Between F and E the shortest route is F-G-C-D-E with an administrative cost of 4.

Between H and E the shortest route is H-D-E with an administrative cost of 2.

Assume that the network is in the base state and that all traffic is on the shortest route. Now consider what happens in a number of failures and restorations.

Failure of the A to B Link

Figure 4:
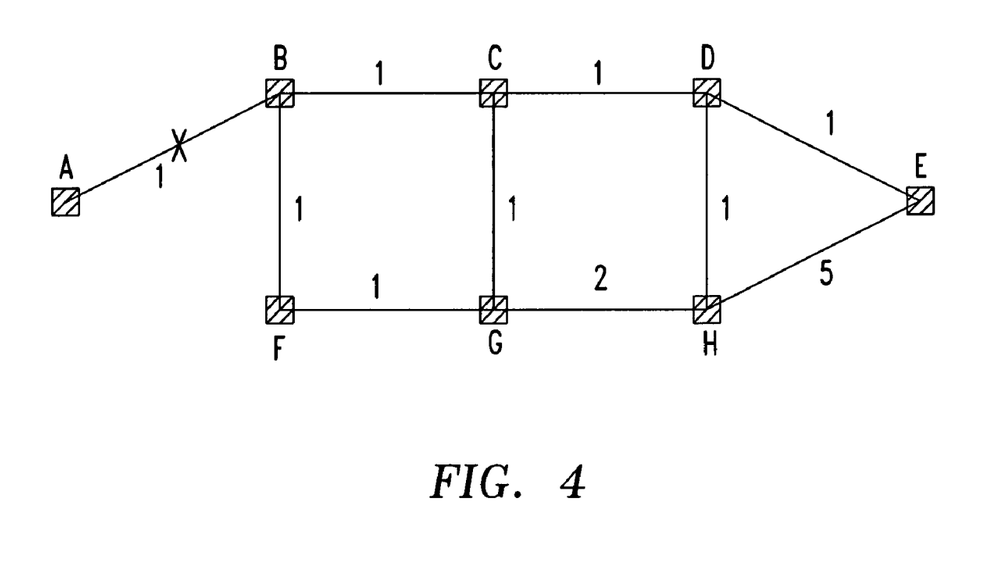

Assume that the A to B link is cut or one of the ports terminating the link fails as is shown in FIG. 4. Only the A to E traffic will be affected. The network will look for another route; but since the failure separates the network into two disconnected pieces, there is none. If the network health method of the invention is executed at this moment, it will report as follows:

1. Unrouted traffic=2.

2. Seriously misrouted traffic=0

3. Off optimal path traffic=0

The other four pieces of traffic remain on their optimal paths. Before the next example, the link is restored. In many systems, such restoration will restore all three values of network health to zero.

Failure of the D to H Link

Figure 5:
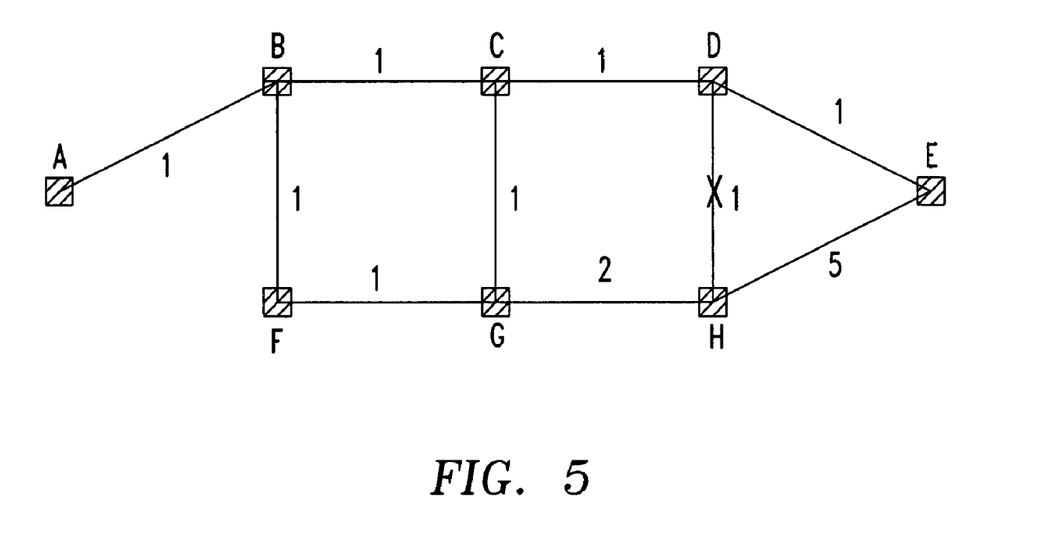

The failure of the D to H link in FIG. 5 is a more interesting case to consider. The network does not disconnect, but two of the shortest paths will not work. The two routes shown below will no longer work:

Between B and H the shortest route is B-C-D-H with an administrative cost of 3.

Between H and E the shortest route is H-D-E with an administrative cost of 2.

Between B and H the best alternate path is now B-C-G-H with an administrative cost of 4. The ratio of the administrative costs is 4/3<1.5

Therefore this traffic will be counted as off optimal. The best alternate path for the H-E traffic is either H-E or H-G-C-D-E. Both have an administrative cost of 5. Since 5/2>1.5, this traffic is counted as seriously misrouted. Thus the network health tool reports:

1. Unrouted traffic=0.

2. Seriously misrouted traffic=5

3. Off optimal path traffic=2

All the traffic is carried, but there are five units that are on a really bad path. Again, before going to the next case, the D to H link is restored, bringing all three measures back to 0.

The method of how the network picks the alternate route is usually out of the control of the network operator. In the example of the D-H edge failing, it may be that the rerouting is done by the nodes at the end of the link. In several real networks, however, the path is chosen by the traffic end point with the lower IP address. This may lead to situations where it is impossible to predict what will happen because of what are known as "race conditions".

Network Congestion

Figure 6:
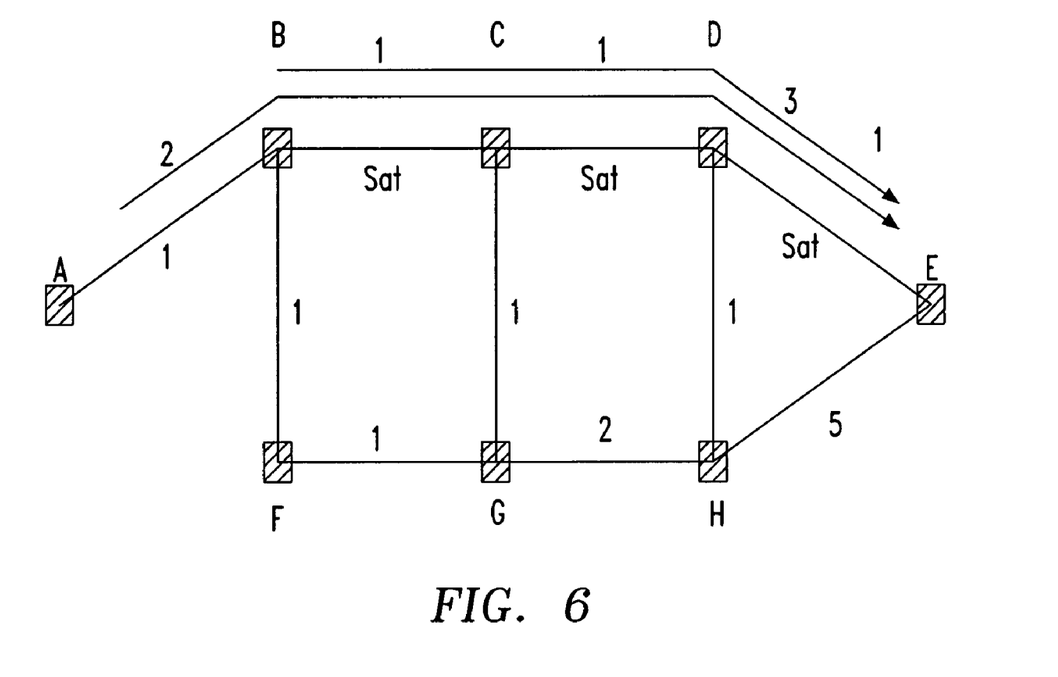
Figure 7:
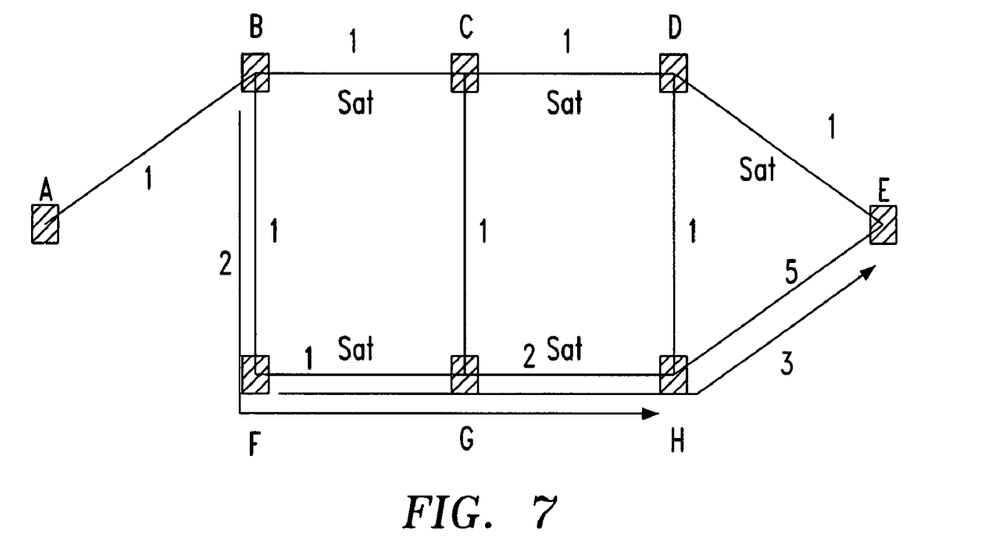

Sometimes the network is congested. In simple terms there is too much traffic. The examples up to now have considered links that were large compared to the traffic. Now suppose that each link has only the capacity to carry five units of flow. After loading the first two pieces of traffic three links are saturated and can carry no additional flow. As seen in FIG. 6, the "2" and "3" attached to the arrows represent the size of the flows while other numbers give the administrative costs. The best path to load the B to H flow is the one that avoids the saturated links is B-F-G-H. This is not the optimal path but it is not bad enough to be severely misrouted. The only available path for the F to E traffic is now F-G-H-E. This has an administrative cost of eight compared to the best path with length four and is severely misrouted. Two additional links become saturated as is shown in FIG. 7. That leaves only one more piece of traffic, from H to E. It can't go directly since there are already three units of flow on the H-E link and can't include any additional traffic. The link from H to D is a cul-de-sac since both links out of node D are saturated. Thus the network health parameters are 1. Unrouted traffic=5

2. Seriously misrouted traffic=3

3. Off optimal path traffic=2 even though there has been no failure.

There are two other possibilities in this situation. If the order of B-H traffic and H-E traffic is reversed then one piece of traffic is not carried but it is now smaller, leaving:

1. Unrouted traffic=3

2. Seriously misrouted traffic=5

3. Off optimal path traffic=2.

Since unrouted traffic is a more serious situation than misrouted traffic, this situation might be thought of as "better" than the other.

The other possibility is that instead of rejecting the five units of H-E flow because the network can't carry it, take two units and block three. That produces the same network health numbers as in the previous paragraph, but a different flow pattern.

The Flow of the Network Health Method

Step 1

Begin the method of the invention by extracting out the topology and the routes that the traffic is using. This is demonstrated in FIG. 8.

Figure 8:
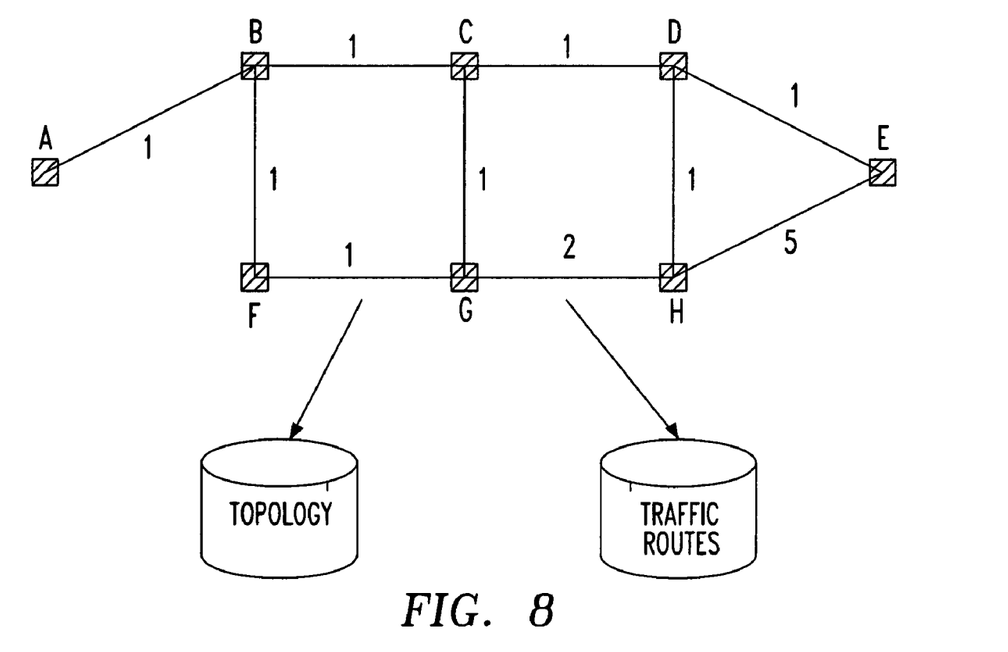
FIG. 8 shows the method step of extracting the topology and the routes that the traffic is using in the network of FIG. 1.

Generally the topology is extracted far less frequently than the routes. Many network topologies are relatively static and only change weekly or monthly during change windows. The traffic routes can change on a minute-by-minute basis, especially if the network is reacting to or recovering from failure.

Step 2

Figure 9:
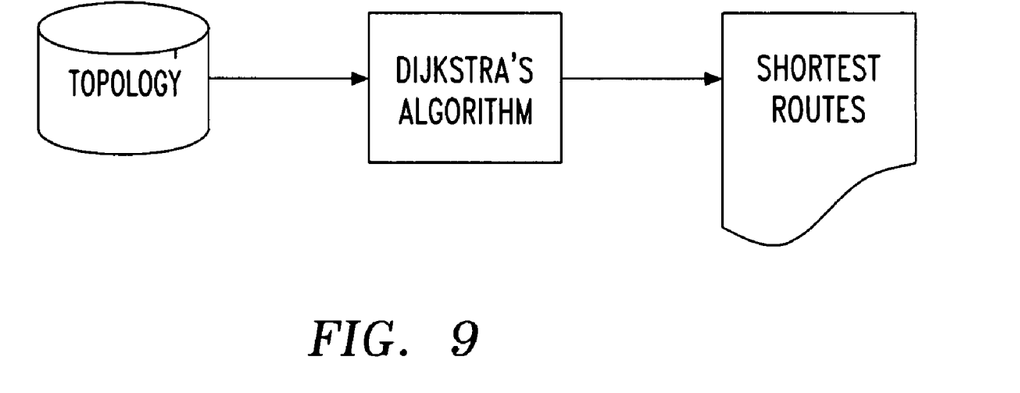
FIG. 9 shows the step of inputting the topology, with the administrative costs, to a shortest path algorithm.

The next step is to process the topology, as illustrated in FIG. 9. The topology, with the administrative costs, is fed to a shortest path algorithm such as Dijkstra's algorithm or Bellman's algorithm. Both are completely standard and can be found in any text that covers graph algorithms.

Step 3

Figure 10:
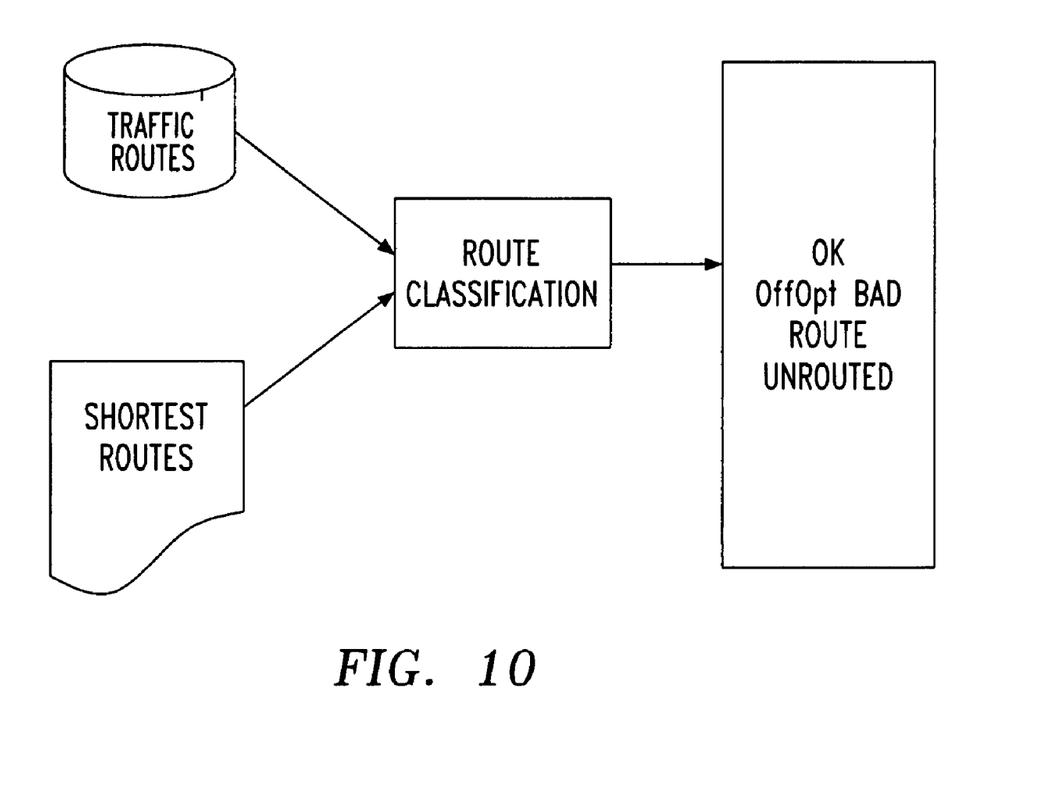
FIG. 10 shows the step of comparing the routes to the shortest route.

Lastly, process the routes by comparing them to the shortest route as is shown in FIG. 10. Every piece of traffic is OK (that is on the shortest path), Off the optimal path, Severely misrouted, or Unrouted. After all the traffic is processed, these numbers are output. As discussed later, these numbers are not of so much of interest alone, but it is their evolution as time passes that gives insight into the condition of the network.

Uses of the Network Health Method

Tuning Restoral Rates

Figure 11:
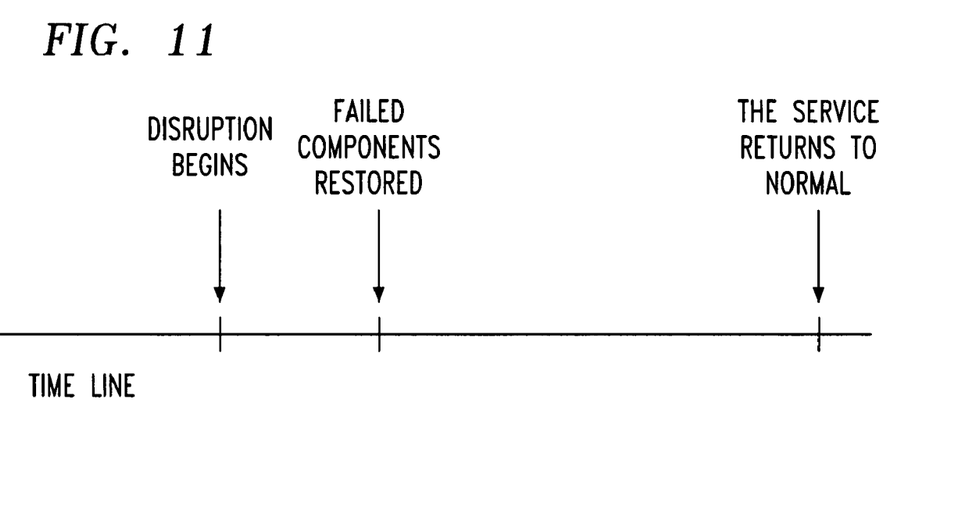
FIG. 11 shows a time scale illustrating that a service disruption can last far longer than the outage that triggered it.

During outages today, network operators tend to fly blind. That is to say that the network handles the failure, but is not instrumented to tell anyone what it is doing. It is understandable that networks don't report their actions in the very recent past since the network may be far too busy to do anything else. Nevertheless, the consequences of an outage may be very long lasting as illustrated in FIG. 11. Even though the time scale is not specific, notice that the service disruption can last far longer than the outage that triggered it because many of the methods operate in a distributed manner and traffic may be moved around many times during the course of the outage. It may take the network a very long time to return to "normalcy".

Figure 12:
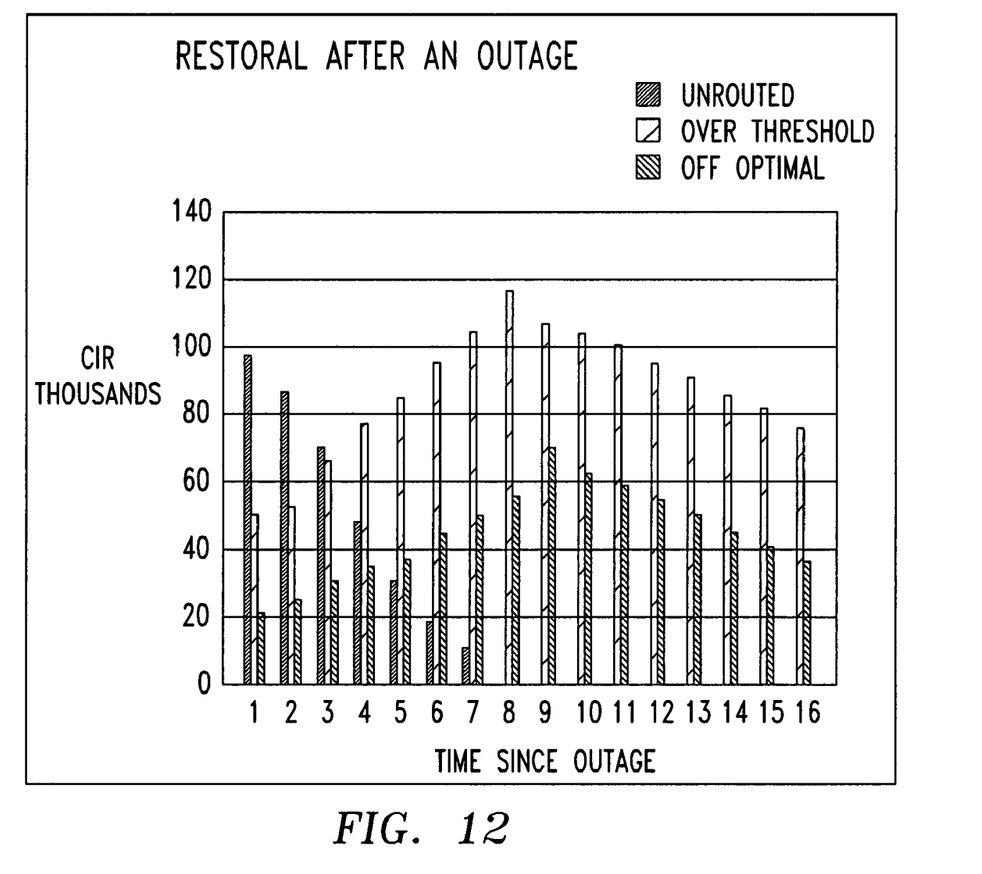
FIG. 12 shows a graph of number of circuits versus time since an outage, and illustrates restoring circuits at a rate parameterized by P.
Figure 13:
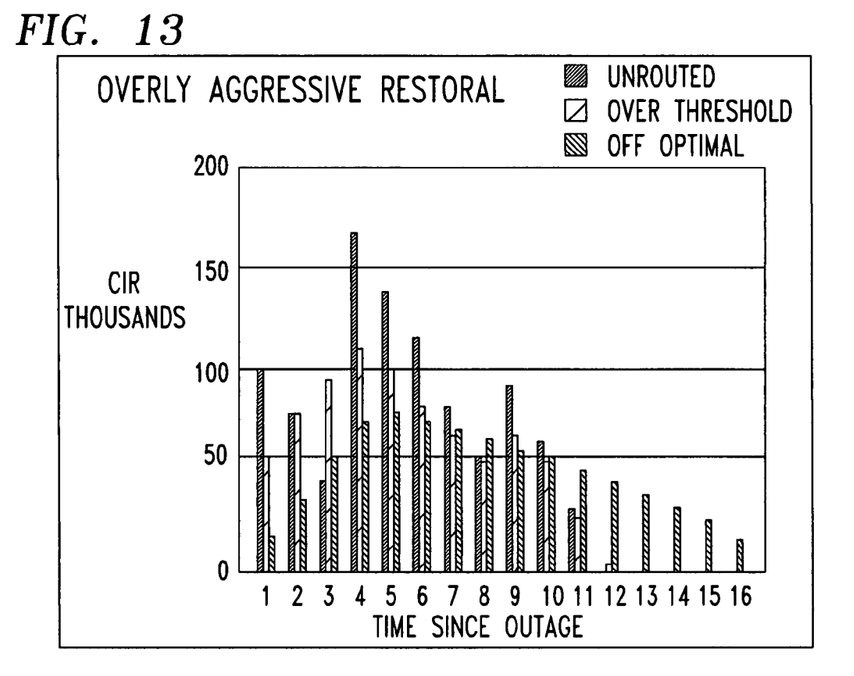
FIG. 13 shows a graph of number of circuits versus time since an outage, and illustrates an overly aggressive restoral.
Figure 14:
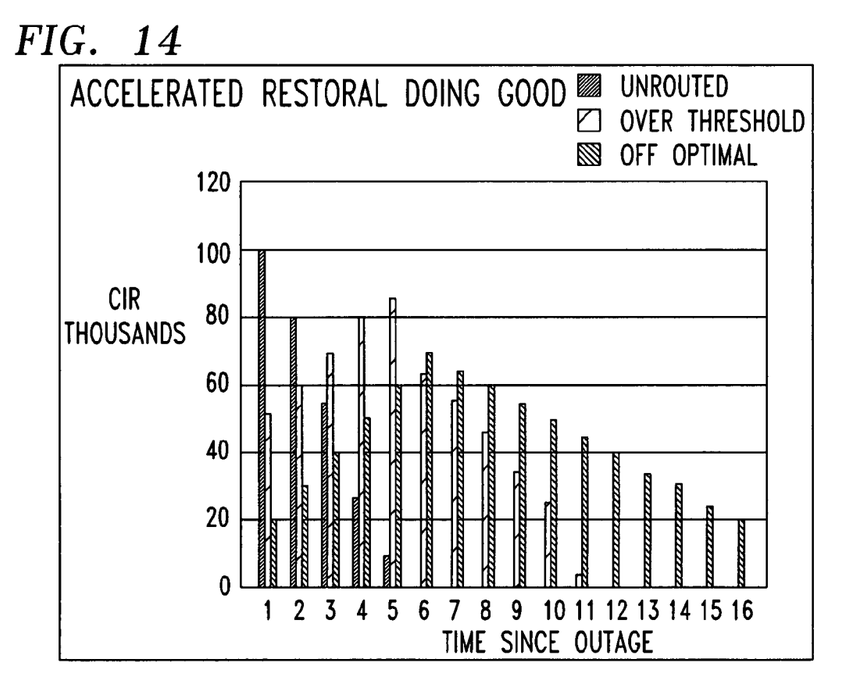
FIG. 14 shows a graph of number of circuits versus time since an outage, and illustrates an accelerated restoral going well.

The goal of any network is to restore the network to health as quickly as possible. If, however, the restoral method is too aggressive there will be subsequent difficulties. Suppose the network is restoring circuits at a rate parameterized by P and the behavior is shown in FIG. 12. Then suppose P is increased, the response is seen in FIG. 13 during the next outage. Notice that the unrouted traffic increases between time period 8 and 9, from which it can be concluded that increasing P made matters worse rather than better. On the other hand if the behavior shown in FIG. 14 is observed, the network operator would increase P in the network so that the time customers experienced unrouted traffic is decreased. Thus, the network health method is useful to tune the restoral rates in a network.

Another use of the network health method is to give a better sense of when bandwidth needs to be added to the network.

Adding Capacity to a Network.

Another use of the Network Health method is in adding capacity to a network. The cost of the underlying links is often the single largest network cost. Usually network operators follow a simple rule: If the traffic on a link reaches 60%, then additional capacity is ordered. The network health method distinguishes between "good" alternate routes and "bad" alternate routes. Assume a 60% utilization constraint and then execute the following steps:

1. Derate each edge to have capacity of 60% of real.

2. Load the traffic according to system loading method.

3. Run the Network Health method and compute (Unrouted, Off Optimal, Seriously Misrouted).

4. If these numbers are over the specification, then add capacity to the network.

This use of the method prevents adding capacity to the network when there are acceptable alternate paths for traffic.

It is to be understood that the above-described embodiments are merely illustrative of the principles of the invention. Various modifications and changes may be made thereto by those skilled in the art that will embody the principles of the invention and fall within the spirit and scope thereof.

What is claimed is:

1. System for monitoring the status of a network comprising:

means for computing a plurality of measures of network health, including a sum of unrouted traffic, a sum of traffic whose cost exceeds a prescribed multiple of an optimal route cost, and a sum of traffic off an optimal path; and means for outputting said measures of network health.

2. The system of claim 1 further comprising:

means for tuning a restoral rate of said network based on said measures of network health.

3. System for monitoring the status of a network comprising:

means for computing a plurality of measures of network health, including a sum of unrouted traffic, a sum of traffic whose cost exceeds a prescribed multiple of an optimal route cost, and a sum of traffic off an optimal path; and means for tuning a restoral rate of said network based on said measures of network health.

* * * * *